United States Patent [19]

Sheppa

[11] 4,161,371

[45] Jul. 17, 1979

[54] SELF-REGULATING TURBINE

[75] Inventor: Milton A. Sheppa, Washington, D.C.

[73] Assignee: The United States of America as represented by the Secretary of the Army, Washington, D.C.

[21] Appl. No.: 127,612

[22] Filed: Nov. 16, 1949

[51] Int. Cl.² .................. F03D 1/02; F42C 15/40
[52] U.S. Cl. .................. 416/43; 60/39.18 C; 102/208; 415/30; 415/64; 416/186 A
[58] Field of Search .................. 253/143, 166, 170, 82; 170/39, 75; 102/208; 415/30, 62, 64; 416/43, 186 A

[56] References Cited

U.S. PATENT DOCUMENTS

| 35,366 | 5/1962 | Dickson | 253/166 |
| 746,388 | 12/1903 | Scheffler | 253/82 |

Primary Examiner—Stephen C. Bentley
Attorney, Agent, or Firm—Nathan Edelberg

EXEMPLARY CLAIM

1. A self-regulating turbine comprising an inner turbine rotor having outwardly extending vanes with air passages between them, an outer rotor member concentric with and extending radially beyond said inner rotor and having limited circumferential motion relative to said inner rotor, said outer rotor member coupled to a load, bosses on said outer member disposed to substantially obstruct the outward flow of air from said air passages in one extreme circumferential position of said outer member, but not in the other extreme circumferential position of said outer member, said bosses shaped as to constitute an extension of said vanes when in said other extreme circumferential position whereby to increase the effectiveness of the rotor at low operating speeds, biasing means acting on said inner turbine rotor thereby urging said outer rotor into said last named position but opposed by air reaction on said vanes toward said first named position, said biasing means comprising a plurality of spring members circumferentially spaced in said outer rotor and directed inwardly thereof, a plurality of spaced studs affixed in said inner turbine rotor and projecting therefrom, said spring members arranged to engage successively said studs to secure non-linear biasing characteristics, and stop means preventing relative rotation of said outer rotor member beyond said other extreme position.

1 Claim, 5 Drawing Figures

SELF-REGULATING TURBINE

The invention described herein may be manufactured and used by or for the Government for governmental purposes without the payment to me of any royalty thereon.

This invention relates to a turbine driven by the relative motion of a fluid such as air and so designed as to reach the optimum speed rapidly and to remain at virtually that speed despite increased relative flow of the fluid medium.

In various classes of fuses as used on ordnance missiles, electronic equipment forms an important part of the operating circuit. Such equipment may be powered in a number of ways but one of those commonly used is a generator powered by a turbine driven by the motion of the missile through the air. In such devices, the increased speed of the missile after the inertia of the rotating mechanism is overcome may cause too high a voltage to be produced by the generator, thus causing damage to or faulty operation of the electronic circuits embodied in the fuse. Furthermore, when such fuses are used at widely varying altitudes, the variation in the density of the atmosphere may cause too rapid rotation at low altitudes or too slow rotation at high altitudes where the air is less dense.

In my invention, I make use of a novel and improved type of turbine rotor such that its efficiency is directly controlled by the pressure of the air against its blades. In this way, I secure increased efficiency of the turbine at low relative speed and at low air densitites, but reduce the efficiency of the device at high relative speeds and high air densities.

The specific nature of the invention as well as other objects and advantages will clearly appear from a description of a preferred embodiment as shown in the accompanying drawings, in which.

Figure 1:
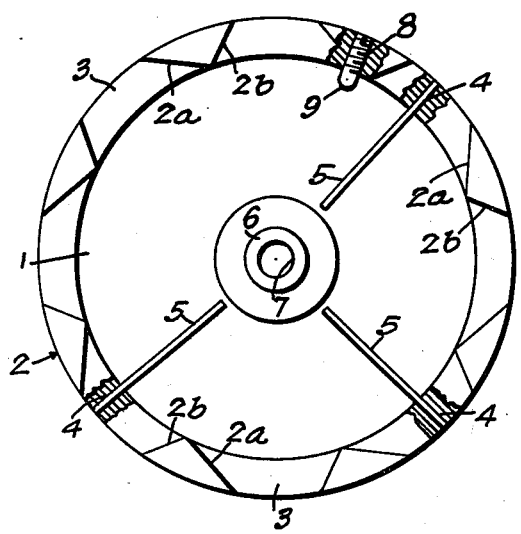
FIG. 1 shows a top plan view of the outer portion of my turbine rotor.

In FIG. 1, there is an outer portion 2 of a turbine rotor which is essentially disc-shaped, having a depression 1 in one surface to receive an inner member 10 as hereinafter described. The outer portion of this rotor has a humber of bosses to change the amount and direction of air received from the inner portions of the blades as will be seen from subsequent figures. It will be noted that these bosses are so shaped that at low speeds air travels from the inner portion to the face 2a of each boss (FIG. 3) and that when the maximum desired speed has been reached, the air is caused to impinge upon faces 2b of the bosses (FIG. 4). Between the bosses, there are channels 3 to afford free passage to the air which is traveling outwardly from the central portion of the rotor. Pierced in the center of the outer rotor is a hole 7 surrounded by a collar 6 which forms a bearing for the inner portion of the rotor. Also pierced in the outer portion of the rotor are one or more holes 4 to accommodate one or more springs 5 for the purpose to be described subsequently. An additional hole 8 is provided to take a stop pin 9, the purpose of which will become apparent. The outer portion of the rotor is coupled to the drive shaft of the generator, as by set screw 16a.

Figure 2:
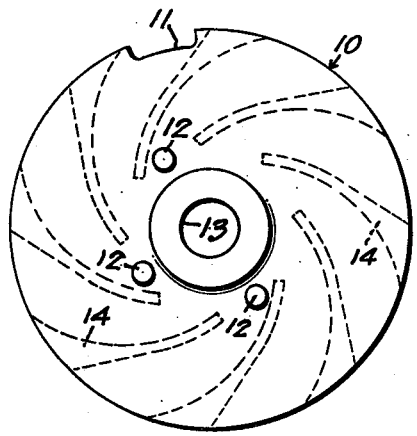
FIG. 2 shows a bottom plan view of the inner portion of my turbine rotor.

FIG. 2 shows the under surface of the inner portion 10 of my rotor. This portion of the rotor is so dimensioned as to fit easily into the recessed portion 1 of FIG. 1. One or more studs 12 are provided to bear against the springs 5 of FIG. 1. A cutout portion 11 is provided to limit the rotational movement of the inner portion of my rotor in respect to the outer portion, this cutout acting in conjunction with the stop pin 9 of FIG. 1. A centrally located hole 13 acts as a bearing in conjunction with sleeve 6 of FIG. 1 providing a pivotal point for the central portion of the rotor.

Figure 3:
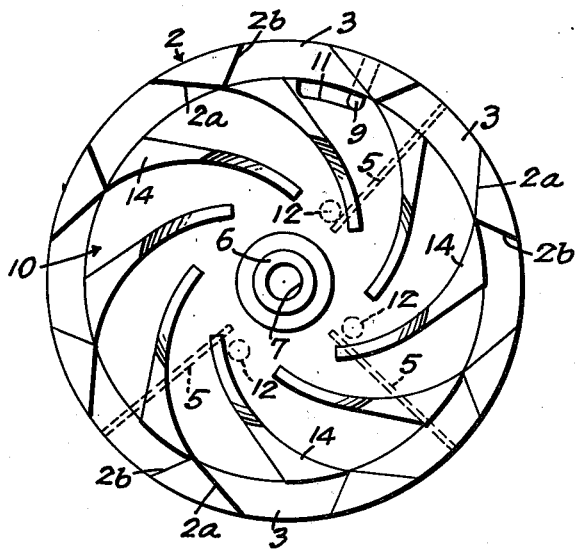
FIG. 3 shows a top plan view of the inner and outer portions of my turbine rotor when assembled and with little or no air moving past the blades.
Figure 4:
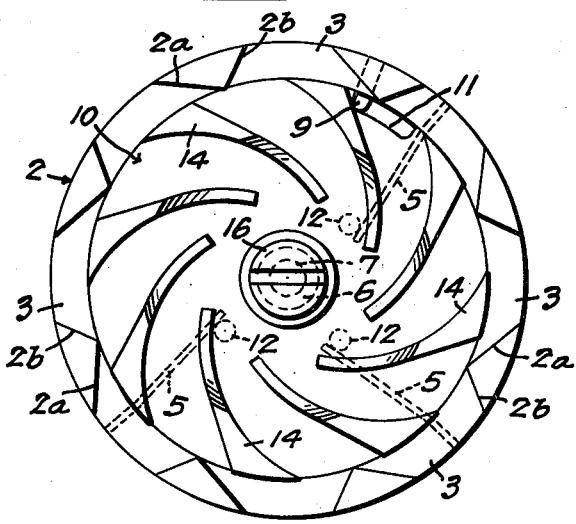
FIG. 4 is the same as FIG. 3 except that it shows the relative positions assumed by the inner and outer portions of my turbine rotor when there is a great degree of relative motion between the missile and the air.

In FIG. 3, the central and outer portions of my rotor have been placed in operating position. It will be apparent that if a stream of air is now directed axially toward the center of the assembly, the air will flow along the inner blades 14 and thence across the faces 2a of the outer blades. This action will cause clockwise rotation of the assembly. The springs (5 of FIG. 1) bear against the pins 12 in such manner as to oppose clockwise motion of the inner portion of the rotor in respect to the outer portion. The stop pin 9 engaging the slot 11 prevents any counter clockwise rotation of the inner portion relative to the outer portion.

In FIG. 4, sufficient air blast has struck the central portion of the assembly to cause not only its rotation as a unit but also relative rotation of the inner portion of the assembly in respect to the outer portion to the limit permitted by stop pin 9 acting with slot 11. It will be seen that air directed along the concave side of the blades 14 no longer passes across the face 2a of the outer portion but instead strikes face 2b thus causing a loss of efficiency in the system and thereby maintaining a relatively uniform speed. A nut or screw 16 prevents physical separation of the inner and outer members.

Some regulation can be obtained by using a single spring 5 but in practice I have found it desirable to use a plurality of springs as shown in FIG. 1. This permits a variable loading to be placed upon the inner portion of my rotor. In this way, the linear characteristics of a spring under stress may be avoided and the desired non-linear characteristic obtained, for the pins 12 of FIG. 2 are so positioned that they do not engage the springs 5 of FIG. 1 simultaneously but pick up these springs in succession, as the relative displacement of the inner portion of the rotor is increased in respect to the outer portion.

The degree of regulation (i.e., the wind pressure vs rotational velocity) can be controlled as desired by proper design of the shape, size, and position of the inner and outer blades, and by the number, strength, and position of the springs and the studs which engage them.

Figure 5:
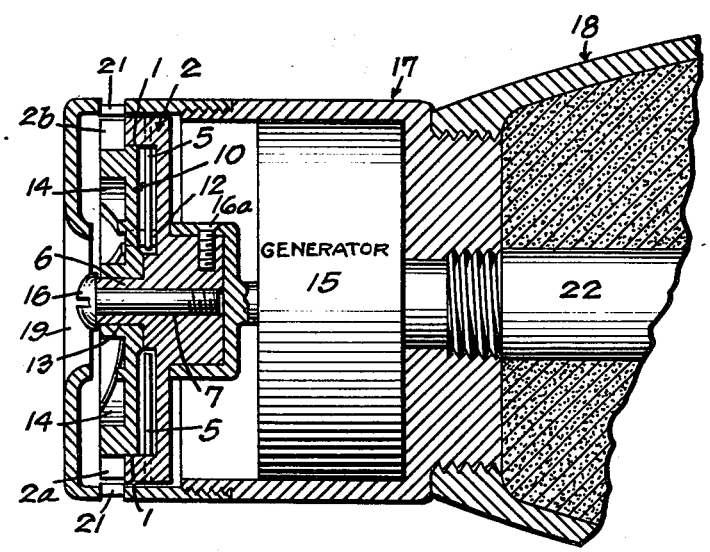
FIG. 5 is a longitudinal section showing the turbine used in a proximity fuse or similar device.

In FIG. 5 the rotor 2, 10 is shown driving a generator 15 to which it is directly connected the whole being mounted in an electric fuse 17 of a missile 18 to provide electric power for the fuse. Air is guided into the nose inlet 19, past the turbine and out through exhaust ports 21. The casing 22 may be used to house electrical components (not shown).

It will be apparent that the embodiments shown are only exemplary and that various modifications can be made in construction and arrangement within the scope of my invention as defined in the appended claims.

I claim:

1. A self-regulating turbine comprising an inner turbine rotor having outwardly extending vanes with air passages between them, an outer rotor member concentric with and extending radially beyond said inner rotor and having limited circumferential motion relative to said inner rotor, said outer rotor member coupled to a load, bosses on said outer member disposed to substantially obstruct the outward flow of air from said air passages in one extreme circumferential position of said outer member, but not in the other extreme circumferential position of said outer member, said bosses shaped as to constitute an extention of said vanes when in said other extreme circumferential position whereby to increase the effectiveness of the rotor at low operating speeds, biasing means acting on said inner turbine rotor thereby urging said outer rotor into said last named position but opposed by air reaction on said vanes toward said first named position, said biasing means comprising a plurality of spring members circumferentially spaced in said outer rotor and directed inwardly thereof, a plurality of spaced studs affixed in said inner turbine rotor and projecting therefrom, said spring members arranged to engage successively said studs to secure non-linear biasing characteristics, and stop means preventing relative rotation of said outer rotor member beyond said other extreme position.

* * * * *